April 18, 1939.  A. L. ARMENTROUT ET AL  2,154,654
APPARATUS FOR RECOVERING OBJECTS FROM WELLS
Filed Feb. 2, 1938  3 Sheets-Sheet 3
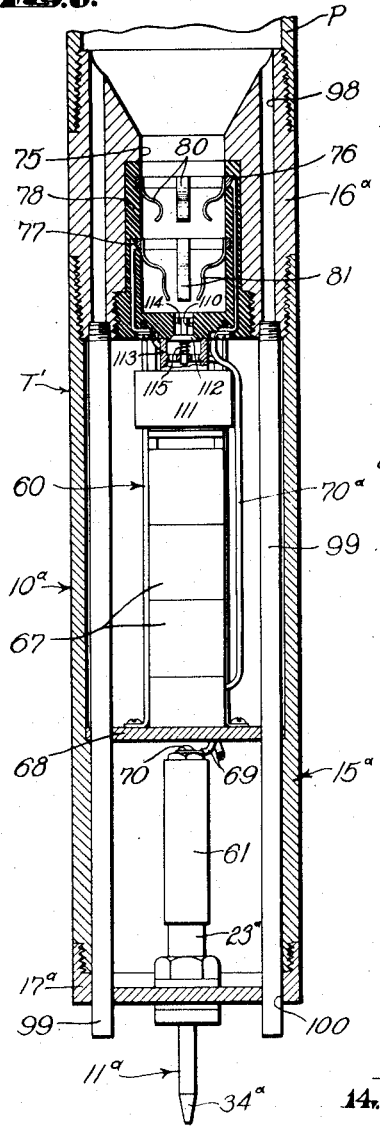
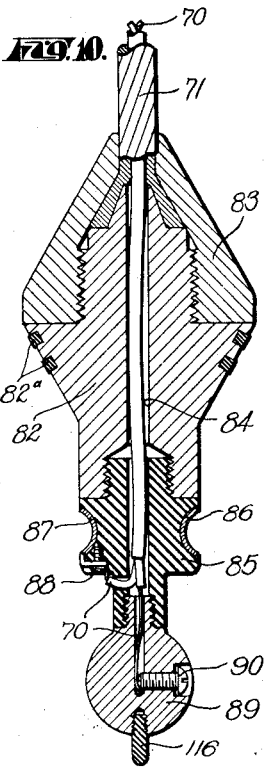
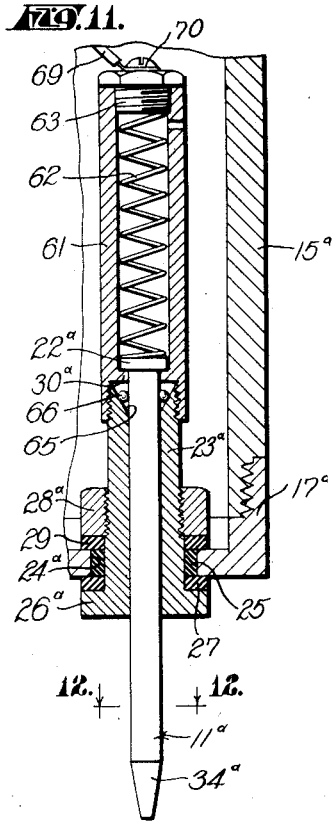
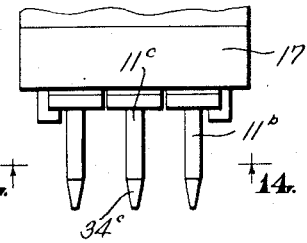
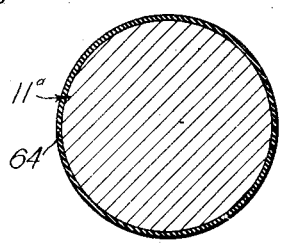
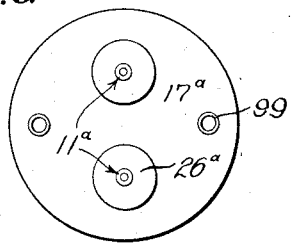
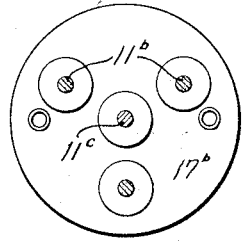
Inventors
ARTHUR L. ARMENTROUT
and
CECIL H. PHILLIPS
By
Their Attorney Patented Apr. 18, 1939

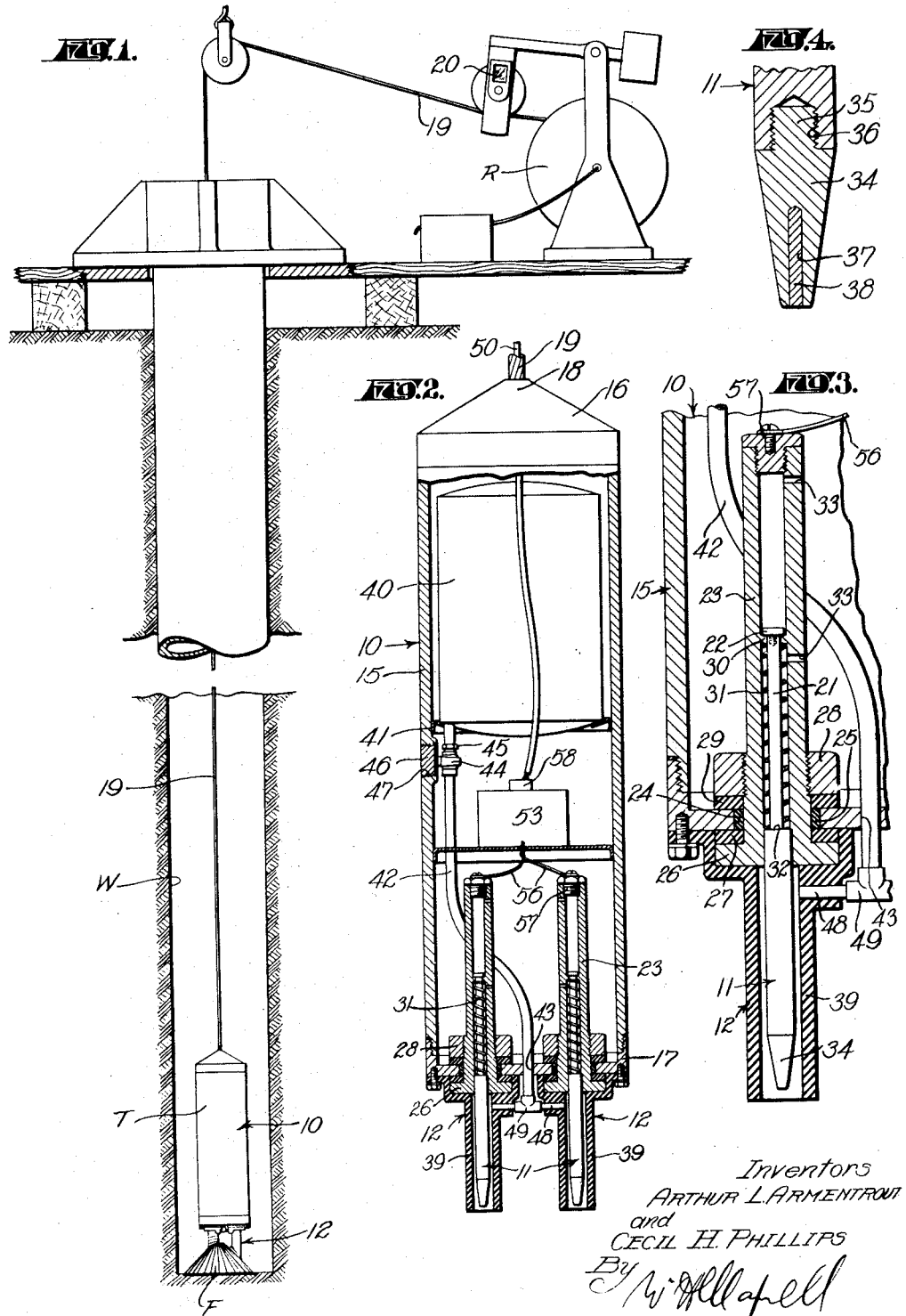

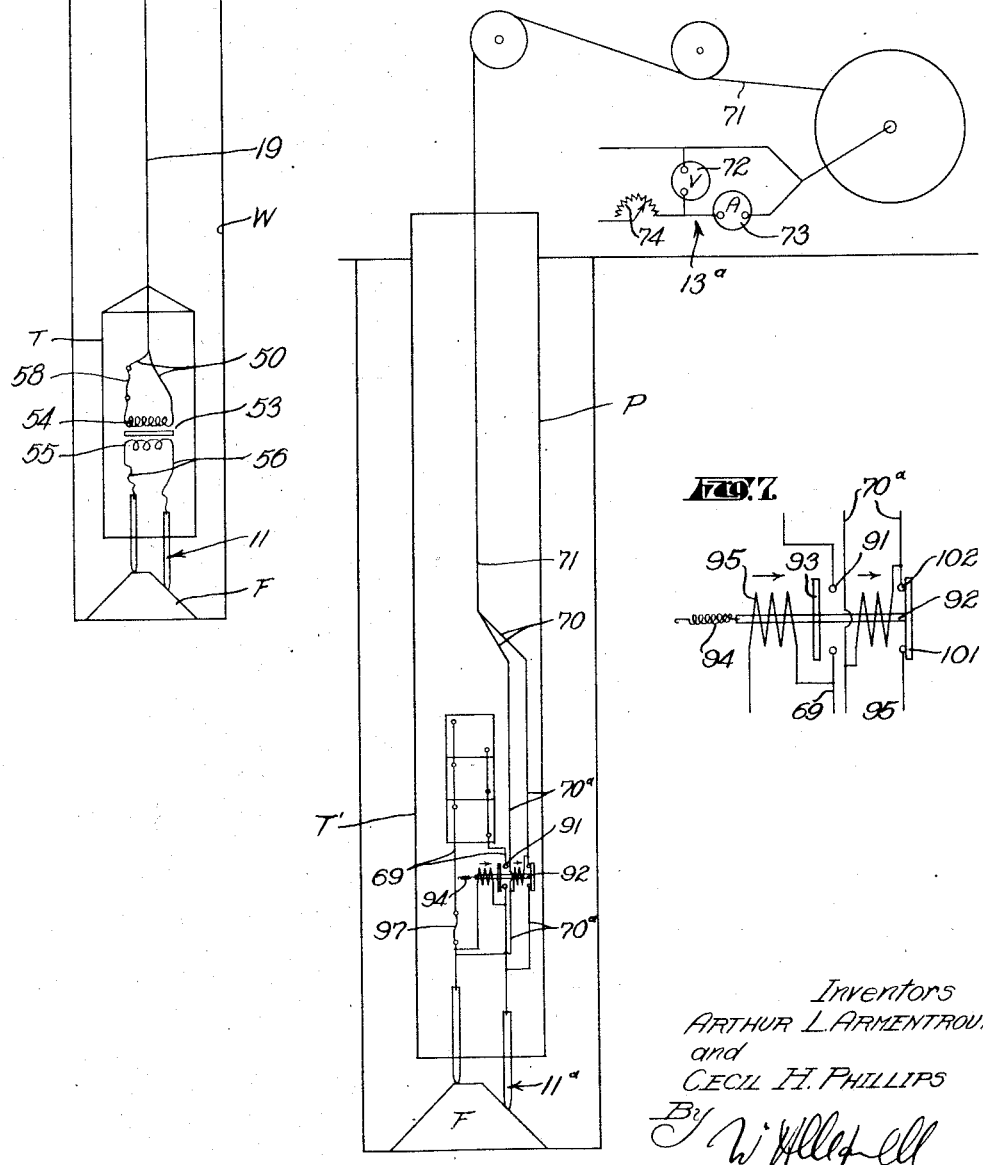

2,154,654

UNITED STATES PATENT OFFICE 2,154,654

APPARATUS FOR RECOVERING OBJECTS FROM WELLS

Arthur L. Armentrout, Los Angeles, and Cecil H. Phillips, Long Beach, Calif.; said Phillips assignor of one-fourth to said Armentrout Application February 2, 1938, Serial No. 188,310

21 Claims. (Cl. 294—1)

This invention relates to apparatus useful in connection with well drilling operations and relates more particularly to an apparatus for recovering lost objects from wells. A general object of this invention is to provide a simple, practical and effective electrically controlled and operated apparatus for fishing objects from wells.

Another object of this invention is to provide apparatus for fishing objects of electrical conducting material from wells that embodies fish engaging parts to be lowered into the well and means for fusing or welding said parts to the fish to securely connect the fish with the parts whereby the fish may be withdrawn from the well.

Another object of this invention is to provide a fishing apparatus of the character mentioned embodying means for informing the operator of the effective engagement of the fish engaging parts or electrodes with the fish and operator-controlled means for subsequently supplying fusing or welding current to the electrodes to fuse them to the fish.

Another object of this invention is to provide an apparatus of the character mentioned in which the electrodes are initially connected in a circuit carrying low strength current, which circuit is completed when the electrodes both engage the fish and completion of this circuit affects a suitable meter or indicator at the ground surface whereupon the operator may apply a fusing or welding current to the electrodes to fuse them with the fish and upon completion of the fusing or welding operation the welding circuit may be opened and the apparatus may be withdrawn from the well to recover the fish.

Another object of this invention is to provide a fishing apparatus of the character mentioned in which the fish engaging parts or electrodes are yieldingly held or spring pressed so that they may conform to and have effective engagement with the fish in the well to assure the creation of strong welds.

Another object of this invention is to provide an apparatus of the character mentioned in which the unit or tool carrying the fish-engaging electrodes may be run into the well on a line or cable or on a string of drill pipe.

A further object of this invention is to provide an apparatus for recovering objects from a well that is particularly effective in recovering comparatively small objects of electrical conducting material and that does not depend upon mechanical gripping parts for gripping and engaging the fish.

The various objects and features of our invention will be fully understood from the following detailed description of typical preferred forms and applications of our invention, throughout which description reference is made to the accompanying drawings, in which:

Fig. 1 is a sectional view of a typical well illustrating one form of apparatus of the invention with its electrodes in engagement with a fish in the well. Fig. 2 is an enlarged vertical detailed sectional view of the fishing tool of the apparatus shown in Fig. 1. Fig. 3 is an enlarged fragmentary vertical detailed sectional view illustrating one of the electrodes and the adjacent parts. Fig. 4 is an enlarged fragmentary vertical sectional view of the lower portion of one of the electrodes. Fig. 5 is a diagrammatic view and wiring diagram of the apparatus shown in Figs. 1 to 4, inclusive. Fig. 6 is a diagrammatic view and wiring diagram of another form of apparatus of the invention showing the fishing tool in the well with its electrodes engaging a fish. Fig. 7 is an enlarged wiring diagram of the control relay of the apparatus shown in Fig. 6. Fig. 8 is an enlarged longitudinal detailed sectional view of the fishing tool of the apparatus shown in Fig. 6. Fig. 9 is a bottom view of the tool shown in Fig. 8. Fig. 10 is an enlarged vertical detailed sectional view of the plug for plugging into the tool. Fig. 11 is an enlarged fragmentary vertical detailed sectional view of the tool shown in Fig. 8 illustrating one of the electrodes and its supporting means. Fig. 12 is an enlarged transverse detailed sectional view taken as indicated by line 12—12 on Fig. 11. Fig. 13 is a fragmentary side elevation of still another form of the invention and Fig. 14 is a horizontal sectional view taken on line 14—14 of Fig. 13.

In the drawings we have shown two forms of devices or fishing tools of the invention and have shown one form of tool used on a line or cable and the other used on a string of drill pipe. Both forms of the invention are suitable for use with a line with a string of drill pipe and the invention is not to be construed as limited to the specific manner of employing or handling the devices that are illustrated in the drawings.

The embodiment of the invention illustrated in Figs. 1 to 5 inclusive, of the drawings includes, generally: a fishing tool T to be run into a well W and comprising a housing or body 10, electrodes 11 projecting from the body 10 to engage a fish F and means 12 for insulating the projecting electrodes 11 from the fluid in the well W and a fusing and indicating circuit 13 for the electrodes 11.

The housing or body 10 is provided to contain and carry the various elements of the tool T. The body 10 is a hollow fluid and pressure-tight member and may comprise a tubular main section 15, a removable head 16 closing the upper end of the section 15 and a head 17 closing the lower end of the section 15. In the particular application of this form of the invention illustrated in the drawings the head 16 is provided with a suitable rope socket 18 and the lower end of a cable or line 19 is received in the rope socket 18 whereby the tool T may be handled or run into and out of the well W on the line. The line 19 may be reeled on a measuring reel R having a meter 20 for indicating the position of the fishing tool T in the well W. The body 10 of the tool T is proportioned to move vertically in the well W with substantial clearance and the body 10, carrying the various parts of the tool T, has sufficient weight to pull the line 19 into the well W.

The electrodes 11 are the fish engaging parts of the tool T and project from the lower end of the body 10 so that they may contact the fish F. There are two like or similar electrodes 11 projecting downwardly beyond the lower head 17 of the body 10. The electrodes 11 are disposed vertically or longitudinally of the body 10 and are spaced apart horizontally to engage and fuse with the fish F at spaced points. In the preferred construction the electrodes 11 are elongate members provided at their upper ends with reduced stems 21 carrying heads 22. The electrodes 11 are preferably shiftable and spring held or spring urged so that they may both have effective engagement with a fish that is irregular in shape or that has a stepped, inclined or non-horizontal upper surface.

The means for shiftably supporting the electrodes 11 on the body 10 include tubes 23 extending through openings 24 in the body head 17. The tubes 23 may extend some distance upwardly in the hollow body 10. Rings 25 of dielectric material insulate the tubes 23 from the walls of the openings 24. Radial flanges 26 are provided on the lower ends of the tubes 23 and washers 27 of dielectric material are arranged between the flanges 26 and the under side of the head 17. Nuts 28 are threaded on the tubes 23 within the body 10 and insulating washers 29 are interposed between the nuts 28 and the upper surface of the head 17. It is believed that it will be apparent how the nuts 28 serve to secure the tubes 23 in place. It will be observed that the tubes 23 are fully insulated from the tool body 10.

The electrodes 11 are slidable or shiftable longitudinally in the tubes 23 to have electrical conducting engagement with the tubes. The parts are related and proportioned so that the electrodes 11 project from the lower ends of the tubes 23 and have their reduced stems 21 entirely received in the tubes. The stems 21 extend through internal flanges 30 on the tubes 23 and the heads 22 are engageable with the flanges 30 to limit the downward movement of the electrodes. Helical springs 31 are arranged in the tubes 23 under compression between the flanges 30 and the shoulders 32 on the electrodes 11. The springs 31 yieldingly urge the electrodes 11 downwardly so that they normally project a substantial distance beyond the lower ends of the tubes 23 as illustrated in the drawings. It may be desirable to provide bleeder openings or vents 33 in the tubes 23 above and below their flanges 30.

Fusible tips or welding tips 34 are provided on the lower ends of the electrodes 11. The tips 34 are preferably removably secured to the electrodes 11 so that they may be readily replaced following use or operation of the tool T. In the construction illustrated in the drawings pins 35 on the upper ends of the tips 34 are threaded in sockets 36 in the lower ends of the electrodes 11 to removably attach the tips to the electrodes. The tips 34 are preferably beveled or substantially pointed. The tips 34 are formed of readily fusible metal or welding metal such as steel, copper, bronze, etc., and preferably carry a suitable flux. In the case illustrated longitudinal openings 37 extend into the tips 34 from their lower ends and contain a suitable flux 38.

The means 12 while not essential may in certain uses or applications of the apparatus be desirable to prevent arcing or short circuiting between the spaced electrodes 11 when the welding current is delivered to the electrodes. The means 12 includes tubular sheaths 39 for the protruding lower portions of the electrodes 11 and the exposed parts of the flanges 26. The sheaths 39 may be secured to the lower end of the head 17 and extend downwardly around the flanges 26 and the electrodes 11. The sheaths 39 surround the electrodes 11 with substantial clearance. In accordance with the invention the sheaths 39 are formed of a readily deformable dielectric material such as a soft rubber composition or the like. It is preferred to proportion the sheaths 39 so that their lower ends are slightly below the lower ends of the electrodes 11 when the electrodes are in their lowermost positions. Accordingly, the sheaths 39 completely surround the protruding portions of the electrodes 11.

The means 12 further includes a tank or container 40 for holding a supply of air or other suitable gas under pressure. The container 40 is preferably housed in the body 10. In the particular construction illustrated in the drawings the container 40 is arranged in the upper portion of the body 10 and is supported on a suitable shelf or bracket 41. The container 40 is such that it is capable of dependably holding air or the like under a pressure of several thousand pounds per square inch. A pipe 42 extends from the container 40 downwardly through the body 10 to pass through an opening 43 in the head 17. The opening 43 is suitably sealed against the entrance of fluid to the body 10. The pipe 42 is controlled by a suitable valve 44. The valve 44 may be located adjacent the container 40 and may be connected therewith by a readily releasable connection 45 whereby the container 40 may be easily removed and replaced when the head 16 is removed from the body section 15. A removable plug 46 closes an opening 47 in the wall of the body section 15. The opening 47 is adjacent the valve 44 and when the plug 46 is removed the valve and the coupling 45 are conveniently accessible.

The air or gas conducting pipe 42 has communication with the interiors of the electrode sheaths 39. The sheaths 39 have tubes 48 communicating with their upper portions and a T or fitting 49 on the pipe 42 delivers the air or gas to the tubes 48. When the tool T is to be run into the well W the valve 44 may be "cracked" or opened slightly to permit the slow passage of the gas or air under pressure through the pipe 42. This air or gas passes into the interiors of the electrode sheaths 39. When the tool T is in the liquid, normally present in a well, the air or gas under pressure continuously supplied to the sheaths 39 effectively prevents the entrance of the liquid into the sheaths. The air or gas is under sufficient pressure to withstand the hydrostatic pressures in the well. It will be apparent how the air or gas within the sheaths 39 prevents contact of the liquid in the well with the electrodes 11 and thereby prevents electrical short circuiting between the electrodes through the fluid.

The circuit 13 for the electrodes 11 is operable to indicate to the operator the engagement of the electrodes with the fish F and is operable under the control of the operator to supply a welding current to the electrodes 11 to fuse their tips 34 with the fish. The circuit 13 includes conductors 50 connected with a suitable source of A. C. current. The conductors 50 are preferably associated with or enclosed in the line 19 which carries the tool T. The current flow through the conductors 50 is controlled by a suitable rheostat 51 at the ground surface and a volt meter 52 and an ammeter 53ª are connected in the conductors. The circuit 13 further includes a transformer 53. The transformer 53 may be housed in the body 10 of the tool T and is such that it steps up the amperage of the current supply to the electrodes 11. The transformer 53 has its primary 54 connected between the conductors 50 and has the terminals of its secondary 55 electrically connected with the electrodes 11. In practice leads 56 may extend from the transformer's secondary 55 to binding posts 57 on the upper ends of the tubes 23. As described above, the electrodes 11 have electrical conducting engagement with the tubes 23. It may be found desirable to connect a fuse 58 in one of the conductors 50 that is designed to break the circuit when the current reaches or exceeds the capacity of the transformer 53.

In the operation of the fishing apparatus illustrated in Figs. 1 to 5, inclusive, of the drawings, the tool T may be connected with the line 19 to be lowered into the well W. Before the tool T is run into the well the valve 44 is cracked or opened to permit a slow leakage of gas or air to the sheaths 39. The tool T may be lowered into the well on the line 19 to a point adjacent the fish F. If the depth or position of the fish F is known the meter 20 may be observed in controlling the reel R to bring the tool T to a position immediately adjacent the fish F. When the tool T approaches the fish F the rheostat 51 is manipulated to deliver a low amperage current to the electrodes 11. As described above, the air constantly discharged into the sheaths 39 prevents the entrance of the well liquids to the sheaths 39 and thus prevents contact of the liquid with the electrodes. When the low amperage current is supplied to the circuit 13 the line 19 may be slowly played out to lower the electrodes 11 into engagement with the fish F. When the electrodes 11 approach the fish F the soft deformable sheaths 39 may be pressed back or deformed by their engagement with the fish to allow the tips 34 of the electrodes to engage the fish. Thus the sheaths do not interfere with contact of the electrodes with the fish F. In the event that the fish F has a non-horizontal upper surface as shown in Fig. 1 of the drawings one electrode 11 may come into engagement with the fish F before the other and continued downward movement of the tool T may cause retraction or distortion of the sheath 39 of the first mentioned electrode. The electrodes 11 are spring held as described above and may remain stationary through contact with the fish F as downward movement of the tool T continues. Thus the spring loading of the electrodes 11 assures the effective engagement of both the electrodes with the fish.

The meters 52 and 53ª are observed when the tool T approaches the fish F and when both of the electrodes 11 engage the fish F to complete the circuit 13 through the electrical conducting fish, the reading of the meters is immediately altered to indicate to the operator that the electrodes have both come into engagement with the lost object or fish. The rheostat 51 is then manipulated to deliver a high voltage current to the conductors 50. The transformer 53 steps up the amperage of this high voltage current and the high amperage current in the electrodes 11 immediately welds or fuses the fusible tips 34 to the fish. The meters 52 and 53ª are observed at this time and when they indicate that good welds have been made between the tips 34 and the fish F and the current capacity of the transformer 53 is approached or reached the rheostat 51 is manipulated to open the circuit 13. The welding or fusing of the tips 34 to the fish F effectively connects the fish with the electrodes 11 and the fish may be withdrawn from the well by reeling in the line 19. Following the recovery of the fish from the well W the valve 44 may be closed and if desired the tips 34 may be replaced to condition the electrodes 11 for further use.

The form of apparatus of the invention illustrated in Figs. 6 to 12, inclusive, of the drawings, includes, generally: a tool T' to be run into a well W and comprising a body 10ª, fusible electrodes 11ª projecting from the body 10ª to engage a fish F and means 60 in the body 10ª for supplying fusing current to the electrodes 11ª and an indicating and controlling circuit 13ª for governing the means 60.

The body 10ª of the tool T' carries the electrodes 11ª and the means 60 and is adapted to be run into the well W to a position adjacent the fish F. The body 10ª is a hollow fluid-tight structure comprising a tubular main section 15ª, a head 17ª closing the lower end of the section 15ª and a head or sub 16ª closing the upper end. The tool T' is adapted to be run into and out of the well W on a string of drill pipe P and the sub 16ª may serve to connect the body 10ª with the lower end of the pipe P. In the particular structure illustrated in the drawings the body 10ª is of substantially the same diameter as the pipe P.

The electrodes 11ª may be similar to the electrodes 11 described above. The electrodes 11ª are spaced horizontally and project downwardly beyond the lower end of the body 10ª. In the preferred structure the electrodes 11ª are shiftable vertically or longitudinally in tubes 23ª arranged through openings 24ª in the head 17ª. The tubes 23ª are insulated from the head 17ª by rings 25 and washers 27ª and 29ª and are secured to the head 17ª by flanges 26ª and nuts 28ª in the same manner as the above described electrodes 11. The electrodes 11ª are shiftable or slidable longitudinally in the tubes 23ª and have electrical conducting engagement with the tubes. The tubes 23ª are provided at their upper ends with tubular extensions 61 and heads 22ª on the electrodes 11ª shift longitudinally in the tube extensions. The heads 22ª are engageable with shoulders or flanges 30ª on the extensions 61 to limit the downward movement of the electrodes. Springs 62 are arranged in the tube extensions 61 and are under compression between the heads 22ª and plugs 63 to yieldingly urge the electrodes 11ª outwardly and to normally hold the electrodes in the positions where their heads 22ª seat on the flanges 30ª. The plugs 63 may close the upper ends of the tube extensions 61. Fusible tips 34ª are provided on the lower ends of the electrodes 11ª and may be identical with the above described tips 34.

It may be found desirable to coat the electrodes 11ª and their tips 34ª with dielectric material. As best illustrated in Fig. 12 of the drawings coatings 64 of insulating material are provided on the electrodes 11ª and their tips 34ª. The coatings 64 may be shellac, lacquer or other suitable coating material having the desired insulating qualities. The coatings 64 effectively insulate the protruding portions of the electrodes 11ª from the liquid in the well W so that there can be no arcing or short circuiting between the electrodes. The coatings 64 are preferably such that the engagement of the electrode tips 34ª with the fish F breaks or chips the coatings from the tips to permit direct physical engagement between the tips and the metallic fish.

Ratchet means may be provided to prevent return movement or downward movement of the electrodes 11ª subsequent to their fusing with the fish F so that the electrodes may assume substantially equal strains and equal portions of the weight of the fish in the event that the electrodes are not in the same vertical positions at the completion of the welding or fusing operation. This means may comprise sockets 65 in the upper ends of the tubes 23ª containing series of balls 66 for contacting the electrodes 11ª. The sockets 65 have downwardly and inwardly inclined walls which maintain the balls 66 in engagement with the electrodes 11ª. The balls 66 are free to contract or move upwardly in the sockets 65 during upward movement of the electrodes 11ª or during downward movement of the body 10ª with respect to the electrodes. The balls 66 in the tapered sockets 65 cooperate with or grip the electrodes 11 to prevent return or downward movement of the electrodes and are capable of transmitting strains and forces between the electrodes and the body 10ª of the tool T when the tool is raised to withdraw the fish F from the well W.

The means 60 is operable under the control of the circuit 13ª to deliver a welding or fusing current to the electrodes 11ª to fuse their tips 34ª to the fish F. The means 60 includes a bank of batteries 67. The bank of batteries 67 is housed in the body 10ª and may be supported on a suitable shelf 68 in the body section 15ª. The bank of batteries 67 has conductors or leads 69 extending to binding posts 70 on the plugs 63. The electrodes 11ª are in electrical engagement with the tubes 23ª and are therefore in electrical connection with the battery leads 69 secured to the plugs 63 on the tube extensions 61.

The circuit 13ª is operable to inform the operator of the electrical transmitting engagement of the electrode tips 34ª with the fish F and is controllable by the operator to complete the circuit from the batteries 67 to the electrodes 11ª to fuse their tips to the fish F and to subsequently break the battery circuit. The control circuit 13ª includes a pair of conductors 70 adapted to be run into the string of drill pipe P. The conductors 70 are suitably insulated by a sheath or cable 71 and are provided at the ground surface with a volt meter 72 and an ammeter 73. The conductors 70 may be connected with any suitable source of electrical current and the circuit through the conductors may be controlled by a suitable rheostat 74. The circuit 13ª further includes a pair of conductors 70ª in the fluid-tight tool body 10ª.

A string of well drill pipe is usually made up of a multiplicity of pipe sections at the time the string is run into the well. It may be found difficult to thread the conductors 70 through the string of pipe P as the same is assembled and run into the well and the invention provides a simple, effective means whereby the conductors 70 may be lowered into the string of pipe P to be electrically connected with the conductors 70ª subsequent to the complete assembling of the string of pipe P. This means includes a central socket 75 entering the upper end of the sub 16ª and provided at its upper end with a downwardly and inwardly inclined wall. Vertically spaced contact rings 76 and 77 are arranged in the socket 75. The rings 76 and 77 are carried by a cup or tube 78 of insulating material on the wall of the socket 75. Contact spring fingers 80 project inwardly from the ring 76 and similar fingers 81 project inwardly from the ring 77.

The conductors 70 and their cable 71 carry a plug 82 which is adapted to enter the socket 75 to effect electrical connection of the conductors 70 with the conductors 70ª. The plug 82 is provided at its upper end with a threaded-on part 83 that forms a rope socket for fixing the plug to the cable 71. The plug 82 has a central longitudinal opening 84 receiving or passing conductors 70. The plug 82 is shaped to fit or enter the socket 75 and has a cylindrical lower portion and an upper portion having a downwardly and inwardly inclined periphery. Packing rings 82ª are provided on the inclined periphery of the plug 82 to seal with the tapered wall of the socket. A block 85 of insulating material is secured to the lower end of the plug 82 and has a peripheral annular groove 86. A contact ring 87 is arranged in the groove 86. One of the conductors 70 is connected with the ring 87 by a suitable screw 88. A substantially spherical head 89 of conducting material is secured to the lower end of the block 85 and the second conductor 70 is connected with the head by a screw 90.

Subsequent to the assembling of the string of pipe P and the running of the pipe into the well, the conductors 70 carrying the plug 82 may be run down through the string of pipe. The plug 82 is adapted to enter and seat in the socket 75. When this occurs the spring fingers 80 cooperate with the contact ring 87 and the contact fingers 81 contact with the head 89 so that the conductors 70 are electrically connected with the conductors 70ª. It is to be understood that the contact fingers 80 and 81 may serve to yieldingly retain the plug 82 in the socket 75 but are yieldable so that the conductors 70 may be withdrawn from the string of pipe P prior to the pulling of the string from the well W.

The invention preferably includes means for automatically draining or discharging liquid from the socket 75 simultaneously with the entrance of the plug 82 to the socket so that such liquid cannot create a short circuit between the contact fingers 80 and 81. A port 110 is provided in the lower end of the socket 75 and has communication with a container 111 within the body 10ª. A valve 112 controls the port 110. The valve 112 seats upwardly to close the opening 110. The stem of the valve 112 is guided by a cage 113 and by a guide head 114 slidable in the port 110. A spring 115 normally holds the valve 112 closed. An extension or tip 116 is provided on the lower end of the head 89. The tip 116 may be insulated. When the plug 82 enters the socket 75 and approaches its final position in the socket the tip 116 enters the port 110 and engages the stem of the valve 112 to open the valve. This permits the escape of liquid from the socket 75. The liquid is free to drain from the port 110 into the container 111. The packing rings 82ª on the plug 82 seal with the tapered wall of the socket 75 to prevent the entrance of fluid in the drilling string to the socket 75. Accordingly, the socket 75 is free of liquid following the seating of the plug 82 in the socket.

The control circuit 13ª further includes a relay for governing the circuit of the batteries 67. This relay includes spaced contacts 91 in one battery lead 69, an armature 92 and a contact 93 on the armature for cooperating with the contacts 91. A spring 94 normally holds the armature 92 in a position where the contact 93 is out of engagement with the contacts 91. An operating winding 95 is provided to shift the armature 92 to the closed position where its contact 93 engages the contacts 91. The operating winding 95 is connected between the conductors 70ª, that is, it has its terminals connected with the conductors 70ª. Accordingly, the operating winding 95 is under the control of the rheostat 74.

The control relay further includes a holding coil 96 operable to retain the armature 92 in the position where its contact 93 engages the contacts 91. The holding winding 96 is connected between the battery leads 69 and is associated with the battery leads in such a manner that it remains de-energized until the battery circuit is completed by engagement of the contact 93 with the contacts 91. A fuse 97 is preferably interposed in one of the battery leads 69 and is operable to open the battery circuit to the electrodes 11ª when effective welds have been formed between the electrodes and the fish F.

It may be desired to break the control and indicating circuit 13ª simultaneously with the completion of the battery circuit through the conductors 69 and the fish F. Spaced contacts 102 may be provided in one of the conductors 70ª and a contact 101 may be provided on the armature 92 to engage the contacts 102. The parts are related so that the spring 94 normally holds the contacts 101 in engagement with the contacts 102. Upon energizing of the coil 95 and the coil 96 the contact 101 moves out of engagement with the contacts 102.

When the tool T' is to be secured to the lower end of a string of drill pipe P as illustrated in the drawings, it is preferred to embody means in the tool for handling circulation fluid. As illustrated in the drawings spaced circulation ports 98 may extend longitudinally through the sub 16ª. The upper ends of the ports 98 have communication with the lower end of the drill pipe P. Tubes or pipes 99 extend downwardly from the ports 98 and pass through the body 10ª and through openings 100 in the head 17ª. The upper portions of the pipes 99 may thread into the ports 98. The pipes 99 are sealed about at the openings 100 to prevent the entrance of fluid to the body 10ª. The pipes 99 are adapted to discharge downwardly at the lower end of the tool T'. The circulation fluid discharged from the pipes 99 may be employed to flush or clean the fish F prior to the engagement of the electrode tips 34ª with the fish and if desired or found necessary may be employed in assisting in freeing the fish from the accumulation of mud, etc. so that it may be more readily withdrawn from the well following the welding or fusing operation.

In the operation of the form of apparatus illustrated in Figs. 6 to 12, inclusive, of the drawings, the tool T' may be secured to the lower end of the string of pipe P and the string may be run into the well in the usual manner. When the tool T' has been brought to a position adjacent the fish F the plug 82 may be lowered through the string of pipe P on the cable 71. As described above the plug 82 is adapted to enter the socket 75 so that the contact fingers 80 may engage the ring 87 and the contact fingers 81 may engage the head 89. This connects the conductors 70ª with the conductors 70. The rheostat 74 may then be manipulated to supply the conductors 70 and 70ª with a low strength current. The pipe P may then be manipulated or lowered to bring the electrodes 11ª into engagement with the fish F. When the tips 34ª come into engagement with the fish F the insulating coatings 64 are chipped or broken from the tips so that the tips come into direct contact with the fish F.

Immediately upon the direct physical engagement of the electrode tips 34ª with the fish F the circuit 13ª is completed through the fish and the meters 72 and 73 give a reading to indicate the engagement of the two electrode tips with the fish F. The low strength current thus employed in the circuit 13ª to indicate the engagement of the two electrode tips 34ª with the fish F is not of sufficient strength to energize the winding 95 and the battery circuit between the bank of batteries 67 and the electrodes 11ª remains open. The electrodes 11ª are spring held and in the event they engage an irregular fish or a fish having a non-horizontal upper side the electrodes may assume positions with their tips 34ª in different horizontal planes. The yielding mountings of the electrodes 11ª assure the proper engagement of the electrode tips 34ª with a fish of practically any shape.

Following the engagement of the electrode tips 34ª with the fish F as just described the rheostat 74 may be manipulated to pass a stronger current through the circuit 13ª to energize the coil 95. Energization of the coil 95 brings the contact 93 into engagement with the contacts 91 to complete the battery circuit from the batteries 67 to the electrodes 11ª and through the fish F and moves the contact 101 out of engagement with the contacts 102 to break the indicating and controlling circuit 13ª. Completion of the battery circuit energizes the holding coil 96 simultaneously with the de-energization of the coil 95 so that the contact 93 is retained in engagement with the contacts 91. Actuation of the control relay to complete the battery circuit as just described provides for the passage of strong battery current through the fusible tips 34ª and through the fish F and this current fuses the tips to the fish F. When extensive and good conducting welds or connections have been formed between the tips 34ª and the fish F and the current strength reaches or approaches maximum the fuse 97 blows out or breaks the battery circuit. This, of course, de-energizes the coil 96 and the spring 94 returns the contact 101 into engagement with the contacts 102 to re-establish the circuit 13ª.

Upon re-establishment of the circuit 13ª its meters 72 and 73 give an indication of the completion of the fusing or welding operation. The conductors 70 may then be withdrawn from the string of pipe P. When the conductors 70 are reeled in the plug 82 is pulled upwardly out of the socket 75. Following the withdrawal of the conductors 70, the string of the pipe P may be pulled from the well to recover the fish F.

As above described, the balls 66 operate to retain the electrodes 11ᵃ against downward movement relative to the body 10ᵃ after the engagement of the electrodes with the fish and the balls 66 assure the imposition of substantially equal strains on the two electrodes when the fish is being pulled free and raised from the well. If desired or found necessary circulation fluid may be pumped downwardly from the string of pipe P prior to the engagement of the electrodes 11ᵃ with the fish F, following the fusing or welding operation or at other times to flush mud from the fish and to assist in freeing the fish from the well.

Figs. 13 and 14 illustrate a form of fish engaging means that may be employed on either of the two types of fishing tools T or T' described above. The fish engaging means illustrated in Figs. 13 and 14 is characterized by a plurality of spaced electrodes 11ᵇ of carbon or the like for delivering current of one polarity to the fish and a fusible electrode 11ᶜ of engaging the fish to deliver current of the opposite polarity thereto and to fuse with the fish.

The electrodes 11ᵇ project from the lower end of the head 17ᵇ of the fishing tool. In accordance with the invention the electrodes 11ᵇ are preferably yieldingly supported or spring urged in the same manner as the electrodes 11 and 11ᵃ and are insulated from the body of the fishing tool. The several carbon electrodes 11ᵇ are connected to one lead or side or pole of the source of current whether it be the batteries 67 or the transformer 53. The electrodes 11ᵇ are spaced apart to cooperate with the fish at spaced points. We prefer to space the electrodes 11ᵇ circumferentially about the vertical center of the head 17ᵇ. There may be any desired number of spaced electrodes 11ᵇ. In the case illustrated there are three equally spaced electrodes 11ᵇ.

The electrode 11ᶜ may be identical with the electrodes 11 and 11ᵃ described above. The electrode 11ᶜ projects downwardly beyond the lower end of the head 17ᵇ and is spring urged in the same manner as the electrodes 11 and 11ᵃ. The electrode 11ᶜ is provided with a removable fusible tip 34ᶜ of steel, copper, bronze, or the like. If desired or believed necessary the electrode 11ᶜ may be insulated or protected from the fluid in the well.

The fishing tool embodying the head or fish engaging means illustrated in Figs. 13 and 14 of the drawings has substantially the same mode of operation as the previously described forms of the invention. When the electrodes 11ᵇ and 11ᶜ engage the fish in the well two or more of the non-fusible electrodes 11ᵇ come into effective contact with the fish and the tip 34ᶜ of the central electrode 11ᶜ engages the fish. When the operator has been made aware of the contact of the electrodes with the fish as described above the welding or fusing current is delivered to the electrodes 11ᵇ and 11ᶜ. This current fuses the tip 34ᶜ to the fish and passes through the fish between the electrodes 11ᶜ and 11ᵇ. The electrodes 11ᵇ being formed of carbon or the like, are not melted or fused by the current. The tip 34ᶜ constitutes the only element of the tool that requires replacement after use, as the non-fusible elements 11ᵇ are not affected by the electrical current and do not require replacement.

Having described only typical preferred forms and applications of our invention we do not wish to be limited or restricted to the specific details herein set forth, but wish to reserve to ourselves any variations or modifications that may appear to those skilled in the art or fall within the scope of the following claims.

Having described our invention, we claim:

1. Apparatus for recovering lost objects from wells comprising a tool to be run into a well, spaced electrodes on the tool, at least one of the electrodes having a fusible part to engage a lost object of electrical conducting material, and means supplying current to the electrodes to fuse the said part to the object.

2. Apparatus for recovering objects of electrical conducting material from wells comprising a unit to be run into and out of a well, electrodes protruding from the unit, at least one of the electrodes having a fusible part adapted to engage an object in the well, and means for supplying current to the electrodes to fuse said part to the object.

3. Apparatus for recovering objects of electrical conducting material from wells comprising a string adapted to be run into and out of a well, a unit carried by the string and including spaced projecting electrodes adapted to engage an object in the well, and means for supplying current to the electrodes to fuse them to be said object whereby the said object may be withdrawn from the well.

4. Apparatus for recovering objects of electrical conducting material from wells comprising a string adapted to be run into and out of a well, a unit carried by the string and including spaced electrodes for contacting a lost object in the well, an electrical circuit in which the electrodes are connected in spaced relation, and means for supplying current to the circuit to cause the electrodes to fuse to the fish.

5. Apparatus for recovering an object of electrical conducting material from a well comprising a unit including a fusible part, means for lowering the unit into the well to have said part contact the said object, and means for completing an electrical circuit through said part and the object to fuse the part to the object whereby the object may be withdrawn from the well.

6. Apparatus for recovering an object of electrical conducting material from a well comprising a unit including a fusible part, means for lowering the unit into the well to have said part contact the said object, means at the upper end of the well for giving an indication to the operator when said part is in engagement with said object, and means for completing an electrical circuit through said part and the object to fuse the part to the object whereby the object may be withdrawn from the well.

7. Apparatus for recovering an object of electrical conducting material from a well comprising a unit including a fusible part, means for lowering the unit into the well to have said part contact the said object, and means controllable at the upper end of the well for passing an electric current through said part and said object to fuse the part to the object whereby the latter is secured to the unit to be removable from the well by the first named means.

8. Apparatus for recovering an object of electrical conducting material from a well comprising a unit including a fusible part, means for lowering the unit into the well to have said part contact the said object, means at the upper end of the well for indicating contact of the fusible part with the said object, and means for completing an electrical circuit through said part and the object to fuse the part to the object whereby the object may be withdrawn from the well.

9. Apparatus for recovering an object of electrical conducting material from a well comprising a body, spaced electrodes, means securing the electrodes to the body to protrude from the lower end thereof and to shift vertically with respect thereto, means for lowering the body into the well to bring the electrodes in contact with said object, at least one of the electrodes being fusible, and means for completing an electric circuit through the electrodes and said object to fuse the fusible electrode to the said object whereby the same may be withdrawn from the well.

10. Apparatus for recovering an object of electrical conducting material from a well comprising a body, spaced electrodes projecting from the body, at least one of the electrodes having a fusible tip for engaging said object, means for running the body into the well to bring the electrode tip into contact with said object, means for electrically insulating the electrodes from the liquids in the well, and means for completing an electric circuit through the electrodes and the object to fuse the fusible tip to the object.

11. A fishing tool useful for recovering objects of electrical conducting material from wells comprising a body adapted to be run into a well, spaced electrodes projecting from the lower end of the body and having fusible parts for engaging an object in the well, and means for conducting electrical current to the electrodes for fusing said parts to the said object.

12. A fishing tool useful for recovering objects of electrical conducting material from wells comprising a body adapted to be run into a well, shiftable spring-held electrodes projecting from the lower end of the body, at least one of the electrodes having a fusible part for engaging an object in the well, and means for conducting electrical current to the electrodes for fusing said part to the said object.

13. Apparatus for recovering an object of electrical conducting material from a well comprising a body, means for operating the body in the well, spaced parts carried by the body and adapted to engage the object, a circuit in which said parts are connected and extending to the upper end of the well for connection with a current source, a fusible tip on at least one of the said parts, and means associated with the circuit at the upper end of the well for controlling current flow therethrough.

14. Apparatus for recovering an object of electrical conducting material from a well comprising a body, means for operating the body in the well, spaced parts carried by the body and adapted to engage the object, a fusible tip on at least one of the said parts, a circuit in which said parts are connected and extending to the upper end of the well for connection with a current source, means at the upper end of the well for controlling current flow through the circuit, and meter means in the circuit at the upper end of the well for indicating the engagement of the said parts with the object.

15. Apparatus for recovering an object of electrical conducting material from a well comprising a body, means for operating the body in the well, spaced electrodes carried by the body and adapted to engage the object, a fusible object-engaging part on at least one of the electrodes, a source of electrical energy carried by the body, and means controllable at the upper end of the well for connecting said source with the electrodes to fuse the said part to the object.

16. Apparatus for recovering an object of electrical conducting material from a well comprising a body, means for operating the body in the well, spaced fusible parts carried by the body and adapted to engage the object, a source of electrical energy carried by the body, electrical indicating means at the upper end of the well for indicating engagement of the said parts with the object, and means controllable at the upper end of the well for connecting said source with the fusible parts to fuse the same to the object.

17. Apparatus for recovering an object of electrical conducting material from a well comprising a body, spaced electrodes projecting from the body, a fusible tip on at least one of the electrodes for engaging said object, means for running the body into the well to bring the electrodes into contact with said object, dielectric coatings on the electrodes for electrically insulating the electrodes from the liquids in the well, and means for completing an electric circuit through the electrodes and the object to fuse the said tip to the object.

18. Apparatus for recovering an object of electrical conducting material from a well comprising a body, spaced electrodes projecting from the body, at least one of the electrodes having a fusible tip for engaging said object, means for running the body into the well to bring the electrode tips into contact with said object, means for electrically insulating the electrodes from the liquids in the well including deformable sheaths around the electrodes in spaced relation thereto and means maintaining air under pressure in the sheaths, and means for completing an electric circuit through the electrodes and the object to fuse the tips to the object.

19. Apparatus for recovering lost objects of electrical conducting material from wells comprising a tool to be run into a well, a plurality of spaced electrodes projecting from the lower end of the tool to engage an object in the well, one of said electrodes being fusible, the other electrodes being formed of non-fusible material, and means for supplying electrical current to the electrodes to fuse the fusible electrode to the object.

20. Apparatus for recovering an object from a well comprising a carrier to be run into the well, a fusible element carried by the carrier to be fused to the object in the well, and means for effecting the fusing of said element to the object.

21. A tool for recovering an object from a well comprising a carrier to be operated in the well, spaced projections on the carrier carrying fusible elements to be fused to the object, and means for effecting the fusing of said elements to weld the object to the projections for removal by the carrier.

ARTHUR L. ARMENTROUT.
CECIL H. PHILLIPS.